April 3, 1962 C. A. WALTON 3,028,087

NUMERIC MULTIPLIER SYSTEM

Filed Dec. 16, 1957

3 Sheets-Sheet 1

INVENTOR
CHARLES A. WALTON

BY John A. Harvey
ATTORNEY

April 3, 1962 C. A. WALTON 3,028,087

NUMERIC MULTIPLIER SYSTEM

Filed Dec. 16, 1957 3 Sheets-Sheet 2

United States Patent Office
3,028,087
Patented Apr. 3, 1962

3,028,087
NUMERIC MULTIPLIER SYSTEM

Charles A. Walton, Owego, N.Y., assignor to International Business Machines Corporation, New York, N.Y., a corporation of New York
Filed Dec. 16, 1957, Ser. No. 703,023
15 Claims. (Cl. 235—161)

The present invention relates to numeric multiplier systems and, more particularly, to systems wherein multiplication is accomplished by electrical relays operating in response to electrical potentials representative of digits in decimal form.

The multiplier system of the invention has particular utility in analog-to-digital converters where a continuous scale factor adjustment of one to ten is required. The present system provides a coarse factor adjustment of one, two, or five, and an associated analog adjustment provides for all in-between scale factors. This greatly reduces the range of the necessary analog adjustment with consequent overall improvement in accuracy and convenience.

It is an object of the present invention to provide a new and improved numeric multiplier system of the electrical relay form and one of relatively simple and inexpensive arrangement.

It is an additional object of the invention to provide a novel numeric multiplier system of the electrical relay type in which the highest-order to lowest-order product digits are successively available substantially concurrently with examination, in the same order, of successive digits of the multiplicand so that use may be made of the highest-order product digits before the lower-order digits of the multiplicand are read and examined. Thus an output device may begin to record the product before its full value is known by examination of the lower order multiplicand digits, and no costly product registers or storage elements are required in accomplishing this novel result.

It is a further object of the invention to provide an improved numeric multiplier system of the electrical relay form which provides one, two, and five times multiplication of a multiplicand of any quantity of digits and in processing each multiplicand digit automatically takes into account in arriving at the value of the corresponding product digit any carry which may be contributed by an adjacent-order multiplicand digit.

Figures 1, 1A:
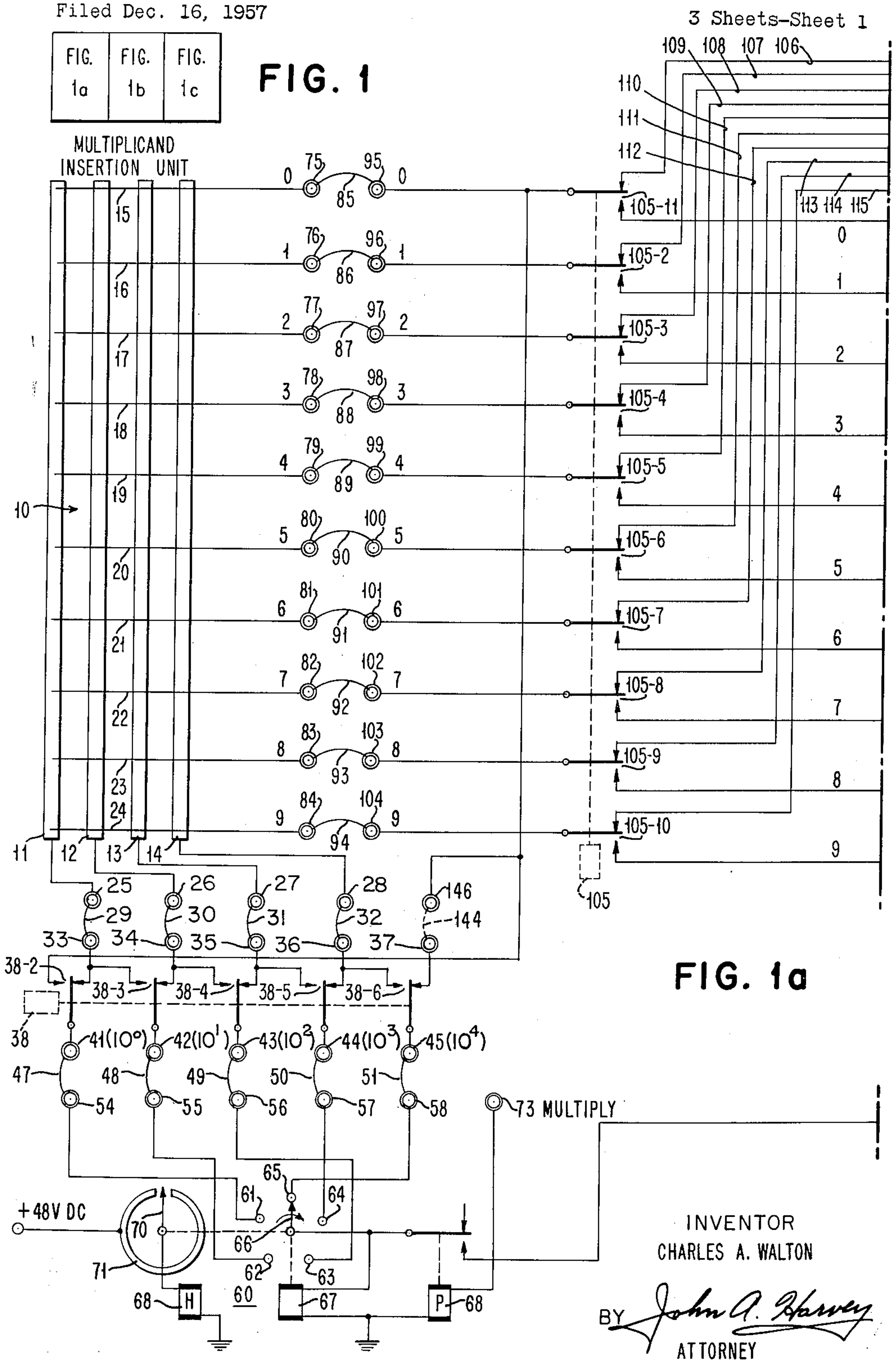
Figure 1B:
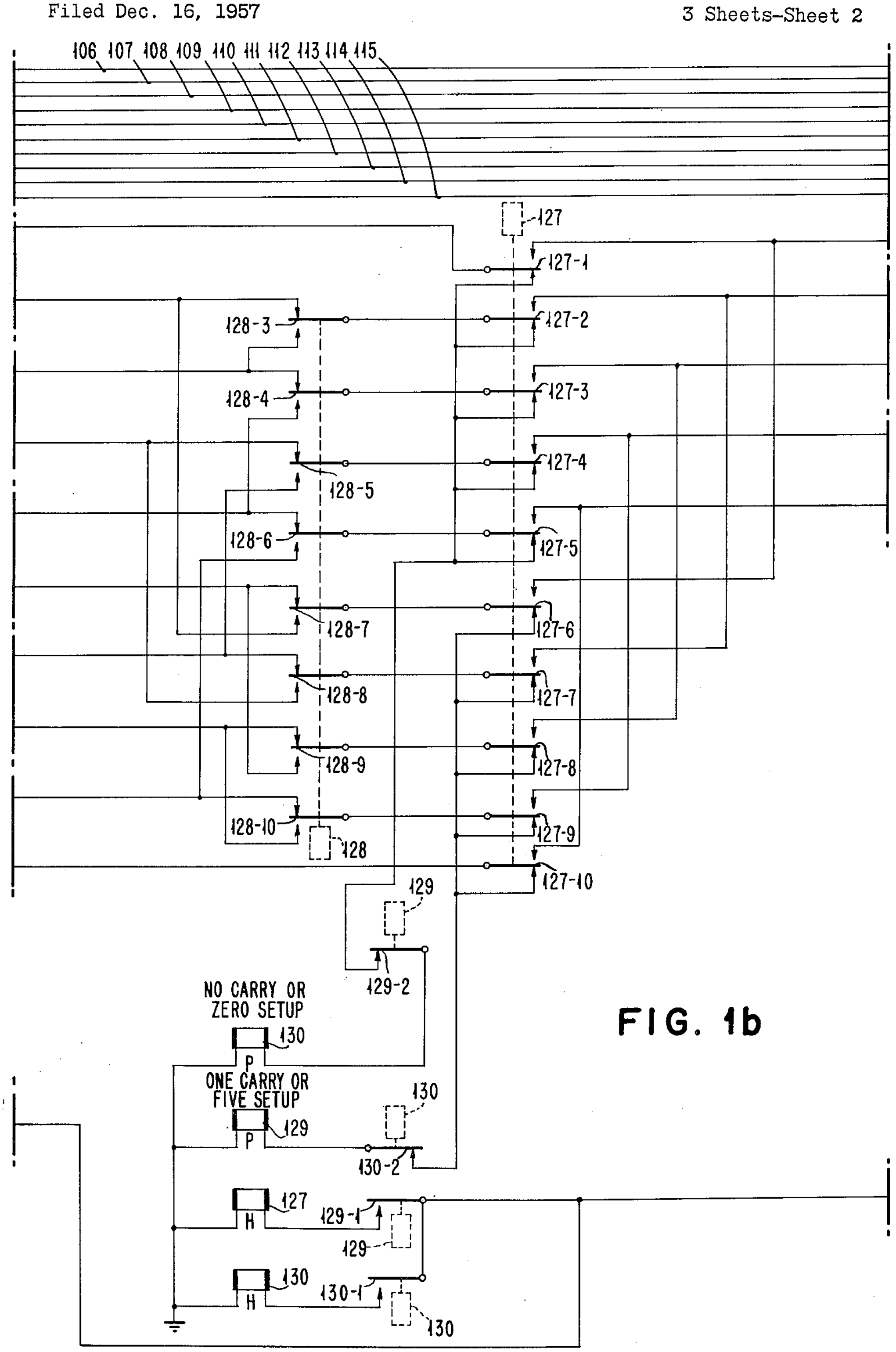
Figure 1C:
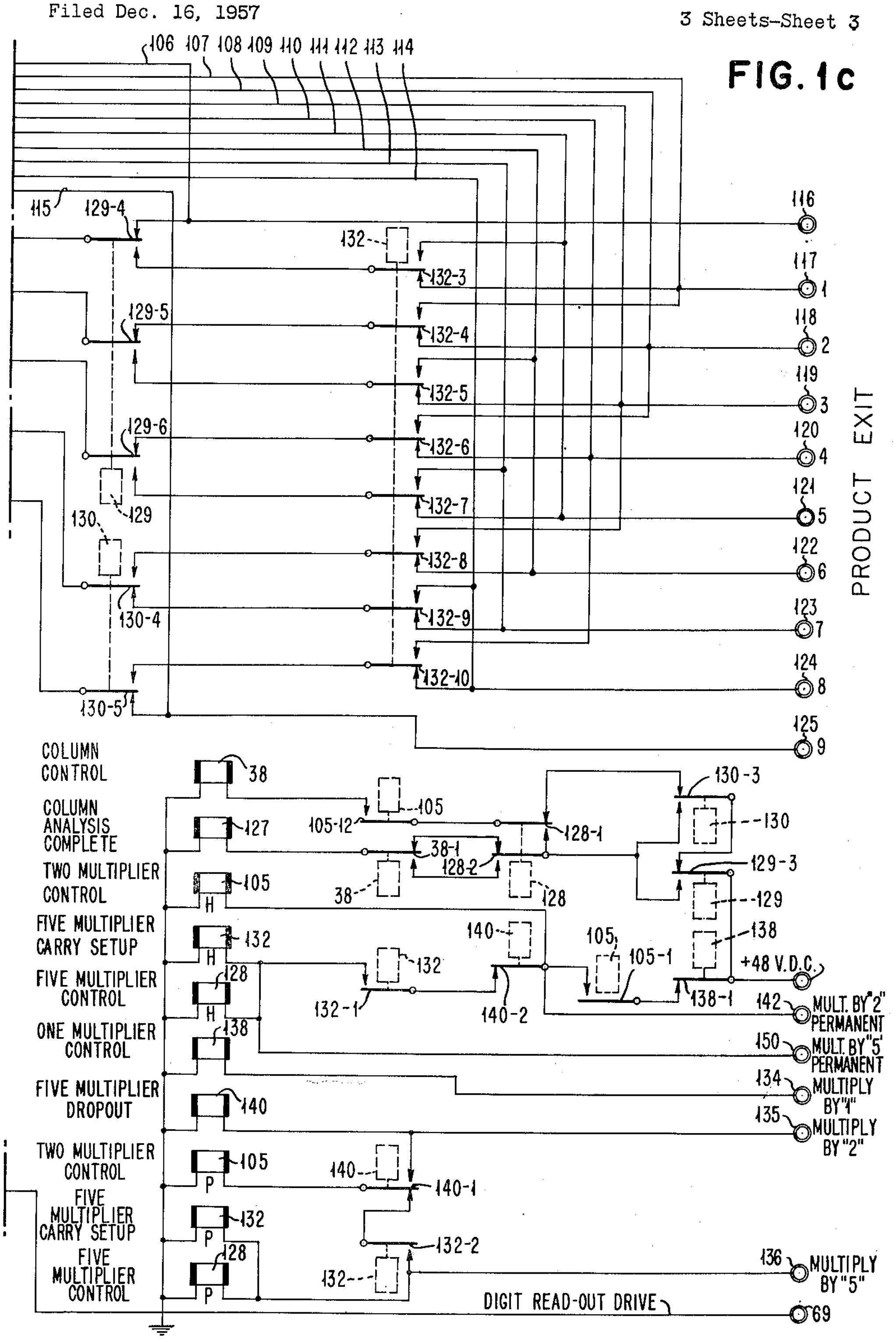

Other objects and advantages of the invention will appear as the detailed description proceeds in the light of the drawings forming a part of this application and in which FIGS. 1*a*–1*c*, which should be considered together as a unitary structure as indicated in FIG. 1, show the electrical circuit arrangement of a numeric multiplier system embodying the present invention in a particular form.

The multiplier system includes, as shown in FIG. 1*a*, a multiplicand insertion unit 10 of the cross-bar type which includes four digit-order conductors 11, 12, 13 and 14 respectively identifying the ones, tens, hundreds and thousands digit order of the multiplicand digits. The unit 10 also includes ten decimal-value conductors 15–24 which are positioned normal to the conductors 11–14 in spaced insulated relation thereto and identify for each multiplicand digit its decimal value within the range 0 through 9, the conductor 15 corresponding to the value 0 and the conductor 24 the value 9. In the interests of simplicity of description, the insertion unit 10 is shown as being adapted to receive a total of four multiplicand digits. The value of the unit-order multiplicand digit is inserted into unit 10 by completing an electrical connection between the conductor 11 and that one of the conductors 15–24 which corresponds to the decimal value of the unit's digit. Similarly the tens, hundreds and thousands order digits of the multiplicand are inserted into the unit 10 by connecting each of the respective conductors 12, 13 and 14 with one of the conductors 15–24 which corresponds to the decimal value of the particular digit. These several interconnections of the conductors 11–14 and 15–24 may be accomplished in any of numerous well known manners as, for example, by electrical contacts (not shown) movable longitudinally of individual digit-order conductors and arranged to bridge the space between these conductors and any of the decimal-value conductors. The unit 10 in its simplest form may simply be comprised by four multi-contact rotary switches, each switch blade then comprising an individual one of the conductors 11, 12, 13 or 14 and the switch contacts then comprising the decimal-value conductors 15–24.

As will presently be explained more fully, the digits of a multiplicand inserted in the unit 10 are read out of this unit beginning with the highest-digit order and proceeding to the lowest-digit order. To this end, the conductors 11–14 terminate in respective plug hubs 25–28 which may be connected by respective flexible conductors 29–32 to respective plug hubs 33–36, the latter together with a plug hub 37 being connected to pairs of the stationary contacts of a column control relay 38 as shown. The transfer contacts of this relay are connected to plug hubs 41–45 which are associated with the read out of five digit orders as indicated by the tens exponent labelling of these plug hubs.

The plug hubs 41–45 are connected by respective flexible conductors 47–51 to respective drive plug hubs 54–58 which in turn are connected to the respective contacts 61–65 of a stepping switch 60 having a movable contact 66. The stepping switch 60 is of conventional construction and includes a stepping magnet 67 which when energized advances a spring biased stepping pawl (not shown) in readiness to stop the switch. The switch 60 does not step, however, until the stepping magnet 67 is again deenergized at which time the pawl spring restores the pawl to its positon of rest and in doing so advances the switch 60 by one step. The stepping magnet is energized by each of successive digit read-out drive pulses applied to the magnet through the normally open contacts of a relay 68 from a digit read-out drive pulse plug hub 69. The relay 68 is energized, to close its contacts, by a "multiply" control potential applied to a multiply plug hub 73. The digit read-out drive pluses are also applied to the movable contact 66 of the switch 60, and thus successive such pulses are distributed to individual ones of the drive plug hubs 54–58 as the switch steps. The multiply potential is applied to the plug 73 for at least that interval required for the switch 60 to take its first step, and a second movable contact 70 and ring contact 71 provided in the stepping switch thereupon energize the hold winding of the relay 68 to insure that the stepping switch shall complete a full five-step cycle of operation. Thus it will be seen that a multiply operation energizes the relay 68 to place the switch 60 into operation and apply successive digit read-out drive pulses to the plug hubs 54–58 by progressing successively from plug hub 58 to the plug hub 54. In this manner, the digit-order conductors 11–14 of the insertion unit 10 are successively energized during a multiply operation and from highest to lowest digit order under control of the column control relay 38.

The decimal-value conductors 15–24 of the insertion unit 10 terminate in respective plug hubs 75–84 which are connected by respective flexible conductors 85–94 to respective plug hubs 95–104. The latter plug hubs are in turn connected to individual ones of the transfer contacts of a relay 105. The normally closed contacts of this relay are connected through conductors 106–115 to respective product exit plug hubs 116–125. The lowest and highest decimal-value normally open transfer contacts of the relay 105 are connected directly to the transfer contacts of a relay 127. The intermediate decimal-value normally open transfer contacts of the relay 105 are connected to the transfer contacts of the relay 127 through the normally closed transfer contacts of a relay 128 as shown. The pairs of stationary transfer contacts of the relay 128 are interconnected with each other as shown for reasons which will be explained hereinafter.

The transfer contacts of the relay 127 are identified as contacts 127–1 through 127–10. Of these, the normally closed transfer contacts 127–1 through 127–5 are connected in common through normally closed contacts 129–2 of a relay 129 to a pickup winding of a relay 130; the normally closed transfer contacts 127–6 through 127–10 are similarly conected in common through the normally closed contacts 130–2 of the relay 130 to the pickup winding of the relay 129. As shown in FIG. 1*b*, the relay 129 has a hold winding connected through normally open contacts 129–1 of this relay to the digit read-out drive pulse plug hub 69 and the relay 130 similarly has a hold winding connected through its normally open contacts 130–1 to the latter plug hub. The normally open transfer contacts of the relay 127 are connected in pairs as shown to the transfer contacts 129–4 to 129–6 of the relay 129 and the transfer contacts 130–4 and 130–5 of the relay 130. The normally closed transfer contacts 129–4 of the relay 129 and 130–5 of the relay 130 are respectively connected to the decimal zero product exit plug hub 116 and the decimal nine product exit plug hub 124, while the normally open transfer contacts 129–4 and 130–5 are connected with the normally closed and normally open transfer contacts 129–5, 129–6 and 130–4 to the transfer contacts 132–3 through 132–10 of a relay 132 as shown. The normally closed transfer contacts of the relay last mentioned are connected directly to the decimal two through eight product exit plug hubs 117–124, respectively, while its normally open transfer contacts are connected as shown to particular ones of the product exit plug hubs for a reason which will presently be explained.

The relays 38, 105, 127, 128 and 132 have pickup and hold windings included in a multiplier control system as shown in FIG. 1*c*. This control system includes a "multiply by 1" plug hub 134, a "multiply by 2" plug hub 135, and a "multiply by 5" plug hub 136. When the plug hub 134 is energized, a relay 138 is energized to open its contacts 138–1 and thus interrupt the hold circuit of the relay 105 if previously picked and held through its normally open contacts 105–1. The contacts 138–1 also interrupt the hold circuit of the relays 128 and 132 if previously picked and held through the normally open contacts 132–1 of the relay 132, the normally closed contacts 140–2 of a relay 140, and the normally open contacts 105–1 of the relay 105. A potential applied to the "multiply by 2" plug hub 135 energizes a five-multiplier-dropout relay 140. The contacts 140–2 of this relay interrupt the hold circuit of the relays 128 and 132 as last described. Its contacts 140–1 close to energize the pickup winding of the relay 105 which then holds through its normally open contacts 105–1 and the normally closed contacts 138–1 of the relay 138. Energization of the "multiply by 5" plug hub 136 energizes the pickup windings of the relays 128 and 132, and the contacts 132–2 of the relay 132 close to energize the pickup winding of the relay 105. The relay 105 thereupon holds as last mentioned and also completes the hold circuit for the relays 128 and 132 previously mentioned.

The column control relay 38 is energized when the relay 105 is energized to close its contacts 105–12, this energization circuit extending through normally closed transfer contacts 128–1 of the relay 128, 130–3 of the relay 130, and 129–3 of the relay 129. The relay 127 is energized either through the normally closed or normally open transfer contacts 38–1 of the relay 38 and 128–2 of the relay 128 and through the normally open transfer contacts 130–3 of the relay 130 or 129–3 of the relay 129.

The overall operation of the multiplier system described will now be considered with respect to programmed multiplications by multiplier digits having the decimal values one, two and five.

To effect multiplication by a multiplier digit having unit decimal value, the plug hub 134 is energized to energize the relay 138. The contacts 138–1 of the latter thereupon open to drop out any of the relays 105, 128 or 132 which might previously have been picked up and held during a preceding multiplication operation. A multiply operating potential applied to the multiply plug hub 73 energizes the relay 68 to place the stepping switch 60 into operation, and successive read-out drive pulses are applied to the plug hubs 41–45 beginning with the plug hub 45. The energization of the latter has no function in the operation presently considered, so that the multiplication actually begins when the next read-out drive pulse is applied to the plug hub 44. The digit-order conductors 11–14 of the multiplication insertion unit 10 are thereupon successively energized from the high-order conductor 14 to the low-order conductor 11 through the normally closed transfer contacts of the relay 38, which remains deenergized throughout the operation, and the multiplicand digits are read out in succession in descending order. At the same time, the relay 105 also remains deenergized so that its normally closed transfer contacts connect the decimal-value conductors 15–24 of the multiplicand insertion unit 10 directly to corresponding ones of the product exit plug hubs 116–124. It will accordingly be seen that for this type of operation the decimal value of each digit of the multiplicand is read out directly to the corresponding decimal value product exit plug hubs 116–125.

When a multiplier digit having the decimal value two is applied to energize the plug hub 135, the relay 140 is energized and thereupon closes its contacts 140–1 to energize the relay 105. The relay 105 closes its contacts 105–12 to energize the column control relay 38 through the normally closed transfer contacts 128–1 of the relay 128, the normally closed transfer contacts 130–3 of the relay 130 and the normally closed transfer contacts 129–3 of the relay 129. At the same time, the hold winding of the relay 105 is energized through the now closed contacts 105–1 of this relay and the normally closed contacts 138–1 of the relay 138. The relay 38 upon becoming energized transfers its contacts 38–2 through 38–6. This causes each digit read-out drive pulse to be initially applied to the next-lower order digit conductor 11–14 of the multiplicand insertion unit 10 than would be the case had the contacts of the relay 38 not transferred. In effect, this reads out the next-lower order digit than that to which the multiplication operation pertains, and the decimal value of this digit is translated through the now transferred contacts of the relay 105 and the normally closed transfer contacts of the relay 128 to the transfer contacts of the relay 127. If this next-lower-order digit has a decimal value from zero to four, it will produce no carry to the higher-order digit concerned in the multiplication step, and accordingly the no-carry relay 130 is energized. If the lower-order digit has a decimal value between five and nine, a carry will result to the higher-order digit with which the multiplication is concerned, and accordingly the digit will cause energization of the carry relay 129. Either relay holds through its normally open contacts 129–1 or 130–1 for the duration of the read-out drive pulse.

It is to be noted that either the carry relay 129 or the no-carry relay 130 must be energized at this time, and the normally closed contacts 129–3 of the former or the normally closed contacts 130–3 of the latter thereupon transfer to deenergize the column control relay 38 and energize the column analysis relay 127 as soon as the normally closed transfer contacts 38–1 of the relay 38 again close. The transfer contacts 38–2 through 38–6 of the relay 38 now resume their normally closed position and the digit read-out drive pulse is now applied to the higher-order one of the digit conductors 11–14 to read out from the unit 10 the particular digit with which the multiplication step is concerned. The decimal value of this digit is translated through the normally open transfer contacts of the relay 105 (now energized) and the normally closed transfer contacts of the relay 128 to the transfer contacts of the relay 127. The latter relay, being now energized, transfers its contacts so that the decimal value conductors 15–24 of the multiplicand insertion unit 10 are connected by pairs to the transfer contacts of the relays 129 and 130 as shown.

If no carry is occasioned by the next-lower-order digit so that the relay 130 is energized in the manner earlier explained, the zero and five decimal conductors 15 and 20 of the multiplicand unit 10 are both connected to the product exit zero-decimal-value output plug hub 116. Likewise, the one and six decimal conductors 16 and 21 of unit 10 are connected to the decimal-two output plug hub 118, the decimal two and seven conductors 17 and 22 of the unit 10 are connected to the decimal four output plug hub 120, the decimal three and eight conductors 18 and 23 of the unit 10 are connected to the decimal-six output plug hub 122, and the decimal one and nine conductors 19 and 24 of the unit 10 are connected to the decimal-eight output plug hub 124. Thus, where the lower-order digit causes no carry into a higher-order digit, the output decimal value of the latter is twice its input decimal value. However, should the lower-order digit effect a carry into the higher-order digit, and thus cause energization of the carry relay 129, it will be seen that the zero and five decimal conductors of the unit 10 are now connected to the decimal-one output plug hub 117; the one and six decimal conductors of unit 10 are connected to the decimal-three output plug hub 119; and similarly that each of the other decimal conductors of the unit 10 are connected to output plug hubs of decimal value corresponding to twice the multiplicand digit decimal value plus one. The multiplied value of the multiplicand digit thus has been increased by the unit-one carry attributable to the next-lower-order multiplicand digit. In this manner, the value of each multiplicand digit may be read out successively from highest to lower order and the resultant product digit is available immediately at the product exit plug hubs, including carries if any, before lower-order multiplicand digits are read out of the insertion unit 10.

In connection with the read out of the units digit of the multiplicand, it will be noted that the normally open transfer contacts 38–2 of the relay 38 are connected directly to the transfer contact 105–11 of the relay 105. Thus a fictitious tens-decimal lower-order digit of zero value is first read out to pick up the no-carry relay 130 in order to effect dropout of the relay 38 and pickup of the relay 127 so that the multiplied decimal value of the multiplicand units digits shall be translated without carry to the appropriate one of the product exit output plug hubs 116–125.

A "permanent multiply by 2" plug hub 142 may be energized where it is desired that the multiplication for a prolonged period be that corresponding to a multiplier digit of value two. The energization of plug hub 142 maintains the hold winding of relay 105 continuously energized even though the one-multiplier control relay 138 should be inadvertently energized by a potential applied to its plug hub 134 (its contacts 138–1 would normally then interrupt the energizing circuit for the holding winding of the relay 105 as previously noted).

Energization of the "multiply by 5" plug hub 136, corresponding to a multiplier digit value of five, effects concurrent energization of the pickup windings of relays 128 and 132. The relay contacts 132–2 of the relay 132 thereupon close to energize the pickup winding of the relay 105, and the relay contacts 105–1 and 132–1 now complete a holding circuit to the hold windings of these relays through the normally closed contacts 140–2 of the relay 140 and the normally closed contacts 138–1 of the relay 138. Also, the relay contacts 128–1 and 128–2 transfer so that the column control relay 38 is now energized only when the relay 129 is energized to close its normally open transfer contacts 129–3 or the relay 130 is energized to close its normally open transfer contacts 130–3. The column analysis complete relay 127 is now energized through the normally open transfer contacts 38–1 as soon as the column control relay 38 becomes energized.

With the relays initially energized as last described, the multiplication operation progresses somewhat differently from that described for a two times multiplication. Whereas in the latter a lower-order digit is sampled to ascertain whether it will cause a carry into the multiplied value of the next-higher-order digit, in the five times multiplication procedure the multiplication develops the tens position value of each partial-product and a higher-order digit is accordingly first investigated to ascertain whether its units position partial-product will effect a carry into the tens position of a partial-product involved in the particular multiplication step. Since the multiplication starts with the highest order digit of the multiplicand, a fictitious higher-order digit is first investigated as the initial multiplication step to determine the carry condition just explained. Accordingly, in the five times multiplication operation, the digit read-out drive plug hub 37 is connected by a conductor 144 indicated in broken lines to a plug hub 146 which is connected to the transfer contact 105–11 of the relay 105.

Now with the stepping switch 60 at its starting position with its contacts 65 and 66 closed, a multiply control potential applied to the plug hub 73 to pick up the relay 68 causes a first digit read-out drive pulse to be applied to the plug hub 58. This pulse is translated through the normally closed contacts 38–6 of the relay 38 (yet deenergized) and the normally open transfer contacts 105–11 of the relay 105 to the normally closed transfer contacts 127–1 of the relay 127. The translated pulse corresponds to a hypothetical higher-order zero digit and accordingly energizes the pickup winding of the no-carry or zero setup relay 130 through the normally closed contacts 129–2 of the relay 129, and the hold winding of the relay 130 thereupon maintains this relay energized as earlier explained for the duration of the drive pulse. The relay 130 upon picking up transfers its contacts 130–3 which thereupon effect energization of the column control relay 38 through the now closed contacts 105–12 and 128–1 of the respective relays 105 and 128 energized as previously described. When the relay 38 is thus energized, its contacts 38–1 transfer and effect energization of the column analysis complete relay 127. The column control relay 38 also now closes its normally open transfer contacts 38–6 so that the same read-out drive pulse which is applied to the plug hub 58 is now applied to the highest order digit conductor 14 of the multiplicand insertion unit 10 to read out the highest order multiplicand digit.

The decimal value of this digit is translated through the normally open transfer contacts of the relay 105 to the contacts of the relay 128 now energized. The read-out pulse, corresponding tothe decimal value of the digit, is further translated through the normally open transfer contacts of the relay 127 (now energized) and the normally closed transfer contacts of the relay 129 (now deenergized) and normally open transfer contacts of the relay 130 (now energized) to the transfer contacts of the relay 132. This relay is energized at this time as previously explained, so the pulse representing the decimal value of the multiplicand digit is translated through the normally open transfer contacts of the relay to one of the product exit output plug hubs 116–125 which corresponds to the tens position of the partial-product resulting from the multiplication of the multiplicand digit times five. In this, read out of the highest-order multiplicand digit was preceded as above explained by read out of a hypothetical higher-order zero digit (which obviously produces no carry into the tens position of the partial-product last mentioned) so that the value of the tens position of the partial-product is immediately known to have a value equal to the decimal value of the read-out multiplicand digit times five. When the digit read-out drive pulse at the plug hub 69 terminates, the stepping switch 60 steps and the no-carry or zero-setup relay 130 hold circuit is no longer energized so that this relay drops out to deenergize the column control relay 38 and the column analysis complete relay 127.

The next read-out drive pulse at the input plug hub 69 is now applied by the stepping switch 60 to the drive plug hub 57. Since the relay 38 is now again deenergized as last mentioned, the drive pulse last mentioned is now translated through the normally closed transfer contacts of the relay 38 to the highest-order digit conductor 14 of the multiplicand insertion unit 10 again to read out the highest-order multiplicand digit. This read-out pulse is accordingly translated over one of the conductors 15–24 of the unit 10 corresponding to the decimal value of the highest-order multiplicand digit and is further translated by the normally open transfer contacts of the relay 105 (now energized) to the contacts of the relay 128 which is also energized at this time. It will be noted that the contacts of the relay 128 are so interconnected that its normally open transfer contacts apply even decimal values of the multiplicand digit to the pickup winding of the no-carry or zero-setup relay 130 whereas the odd decimal values of the multiplicand digit are all applied to energize the one-carry or five-setup relay 129. This in effect has the significance that an odd decimal value of a higher-order digit investigated causes a numeric five to be inserted in the units position of the partial-product which results when the next-lower order digit is multiplied by five. The result of this will presently become apparent.

As soon as one of the relays 129 or 130 has been energized in the manner last mentioned, and is maintained energized by the digit read-out drive pulse applied to its hold winding, the column control relay 38 and column analysis complete relay 127 are both picked up by the transfer contacts 129–3 of the relay 129 or 130–3 of the relay 130. The digit read-out drive pulse yet appears at the drive plug hub 57 and is now applied through the normally open transfer contacts 38–5 of the relay 38 to the next-lower order digit conductor 13 of the multiplicand insertion unit 10. The read-out pulse is thereupon translated over the one of the conductors 15–24 of unit 10 which corresponds to the decimal value of this next-lower order multiplicand digit, the pulse being further translated through the normally open transfer contacts of the relay 105 and the normally open transfer contacts of the relay 128 to the transfer contacts of the relay 127. This relay is also energized at this time, so that the pulse is again translated through the normally open transfer contacts of the relay to the transfer contacts of the relays 129 and 130. It will be apparent that if the highest-order digit which was sampled at the beginning of this multiplication step had an even decimal value to pick up the relay 130, the pulse representative of the decimal value of the next-lower-order multiplicand digit is translated through the normally closed transfer contacts of the relay 129 or the normally open transfer contacts of the relay 130 and through the normally open transfer contacts of the relay 132 (now energized) to that one of the product exit output plug hubs 116–125 which corresponds to the tens position (without carry) of the partial-product resutling from multiplication of the next-lower-order multiplicand digit by five. If, on the other hand, the highest-order multiplicand digit had had an odd digit value to pick up the relay 129, then the pulse representing the digit value of the next-lower-order multiplicand digit would be translated through the normally open transfer contacts of the relay 129 and the normally closed transfer contacts of the relay 130. Inspection will reveal that in this instance the drive pulse appears at that one of the product exit output plug hubs 116–125 which corresponds to the addition of a numeric five in the tens position of the partial-product resulting from the multiplication of the next-lower-order multiplicand digit by five. It is apparent that this numeric five added in the tens partial-product position has resulted from the fact that the higher-order digit produced in the units position of its partial-product a numeric five and that this numeric five must be added into the tens position of the partial-product of the next-lower-order digit when the latter is multiplied.

The multiplication above described proceeds in the same fashion to completion when the lowest-order multiplicand digit is read out the second time to pick up one of the relays 129 or 130 (i.e. to ascertain whether a numeric five carry is present in the units position of its partial-product) and is followed by read out through the normally open contacts 38–2 of the relay 38 (then energized) of a fictitious decimal-order digit of zero value in order that the value of the units position of the partital-product of the lowest-order multiplicand digit shall be transmitted to either the decimal zero output plug hub 116 or decimal five output plug hub 121 according to whether the lowest-order multiplicand digit has respectively even or odd decimal value. It will be seen that each digit of the product from highest to lowest orders becomes immediately available as each multiplicand digit is read out of the insertion unit 10 beginning with the highest-order such digit and proceeding to the lowest-order multiplicand digit. The successive product digits are thus immediately available to be typed out by a typewriter connected to the output plug hubs 116–125 or punched out by a tape or card punch unit likewise connected. This serial read out of the product digits from highest to lowest orders is particularly valuable in those instances where the product is typed out by a typewriter which normally types the product serially by digits beginning highest order first.

A "permanent multiply by 5" plug hub 150 may be energized, to maintain the relays 128, 132 and 105 energized, where it is desired to effect a prolonged five-times multiplication.

While a specific form of the invention has been described for purposes of illustration, it is contemplated that numerous changes may be made without departing from the spirit of the invention.

I claim:

1. A numeric serial-digit multiplier system comprising multiplying means controlled by the value of a multiplier digit and responsive to the decimal value of each of plural multiplicand digits successively presented from highest to lowest orders to said multiplying means for converting the value of said each multiplicand digit to the decimal value of a corresponding output product digit, partial-product control means responsive to the decimal value of multiplicand digits successively presented thereto and of order next adjacent to that of said each multiplicand digit for establishing the value of any partial-product contributed by said adjacent-order and modifying in accordance therewith the conversion value effected by said multiplying means, and means for alternating the operations of said multiplying and control means in developing successive ones of said output product digits.

2. A numeric serial-digit multiplier system comprising multiplying means controlled by the value of a multiplier digit and responsive to the decimal value of each of plural multiplicand digits successively presented from highest to lowest orders to said multiplying means for converting the value of said each multiplicand digit to the decimal value of a corresponding output product digit, partial-product control means responsive to the decimal value of multiplicand digits successively presented thereto and of order next adjacent to that of said each multiplicand digit for establishing the value of any partial-product contributed by said adjacent-order digit and modifying in accordance therewith the conversion value effected by said multiplying means, and means for rendering said partial-product control means operative prior to each digit conversion operation of said multiplying means in developing successive ones of said output product digits.

3. A numeric serial-digit multiplier system comprising multiplying means controlled by the value of a multiplier digit and responsive to the decimal value of each of plural multiplicand digits successively presented from highest to lowest orders to said multiplying means for converting the value of said each multiplicand digit to the decimal value of a corresponding output product digit, partial-product control means responsive to the decimal value of multiplicand digits successively presented thereto and of order next adjacent to that of said each multiplicand digit for establishing the value of any partial-product contributed by said adjacent-order digit and modifying in accordance therewith the conversion magnitude effected by said multiplying means, and means for supplying said adjacent-order digit to said control means prior to the presentation of said each multiplicand digit to said multiplying means to preestablish any conversion modification required by a partial-product.

4. A numeric serial-digit multiplier system comprising multiplying means selectively actuated by the two and five digit values of a multiplier digit and responsive to the decimal value of each plural multiplicand digits successively presented from highest to lowest orders to said multiplying means for converting the value of said each multiplicand digit to the decimal value of a corresponding output product digit, partial-product control means responsive to said two and five digit values of said multiplier digit and to the decimal value of multiplicand digits successively presented thereto and of respectively next-lower and next-higher order than that of said each multiplicand digit for establishing the value of any partial-product contributed by said adjacent-order digit and modifying in accordance therewith the conversion value effected by said multiplying means, and means for alternating the operations of said multiplying and control means in developing successive ones of said output digits.

5. A numeric serial-digit multiplier system comprising multiplying means actuated in response to a multiplier digit of value two and responsive to the decimal value of each of plural multiplicand digits successively presented from highest to lowest orders to said multiplying means for doubling the value of said each multiplicand digit in developing a corresponding decimal valued output product digit, partial-product control means responsive to said multiplier digit and to the decimal value of multiplicand digits successively presented thereto and of next-lower order than that of said each multiplicand digit for finding the existence of any unit value partial-product which may be contributed by said adjacent-order digit and upon finding such partial-product modifying the operation of said multiplying means effectively to add a unit value to the doubled value of said each multiplicand digit in developing said corresponding output product digit, and means for alternating the operations of said multiplying and control means in developing successive ones of said output product digits.

6. A numeric serial-digit multiplier system comprising multiplying means actuated in response to a multiplier digit of value five and responsive to the decimial value of each of plural multiplicand digits successively presented from highest to lowest orders to said multiplying means for developing the corresponding tens-position output product decimal digit of the partial-product contributed by said each multiplicand digit, partial-product control means responsive to said multiplier digit and to the decimal value of multiplicand digits successively presented thereto and of next-higher order than that of said each multiplicand digit for finding the existence of any units-position partial-product contributed by said adjacent-order digit and upon finding such partial-product modifying the operation of said multiplying means effectively to add a decimal five digit to said tens-position output product digit contributed by said each multiplicand digit, and means for alternating the operations of said multiplying and control means in developing successive ones of said output product digits.

7. A numeric serial-digit multiplier system comprising means for selecting multiplicand digits successively from highest to lowest orders, multiplying means controlled by the value of a multiplier digit for converting the value of each successively selected multiplicand digit to the decimal value of a corresponding output product digit, and partial-product control means responsive to the decimal value of next-adjacent-order multiplicand digits also successively selected by said selective means and presented thereto for modifying the conversion value effected by said multiplying means by the value of any partial-product contributed by said adjacent-order digit.

8. A numeric serial-digit multiplier system comprising means for successively selecting each multiplicand digit and its adjacent-order digit with the selection progressing from highest to lowest digit orders, multiplying means controlled by the value of a multiplier digit for converting the value of each successively selected multiplicand digit to the decimal value of a corresponding output product digit, and partial-product control means responsive to the value of a corresponding one of said each adjacent-order digits for modifying the conversion value effected upon each said selected multiplicand digit by said multiplying means by the value of any partial-product contributed by said corresponding adjacent-order digit.

9. A numeric serial-digit multiplier system comprising means for successively selecting each multiplicand digit and its adjacent-order digit from highest to lowest digit orders and with the selection of the adjacent-order digit preceding that of the associated multiplicand digit, multiplying means controlled by the value of a multiplier digit for converting the value of each successively selected multiplicand digit to the decimal value of a corresponding output product digit, and partial-product control means responsive to the value of a corresponding one of said each adjacent-order digits for modifying the conversion value effected upon each said selected multiplicand digit by said multiplying means by the value of any partial-product contributed by said corresponding adjacent-order digit.

10. A numeric serial-digit multiplier system comprising a plurality of decimal-valued input circuits adapted to be individually energized in accordance with the decimal value of each successive multiplicand digit selected and applied thereto from highest to lowest orders, multiplier control relay means actuated in response to the magnitude of a multiplier digit for connecting each of said input lines to an individual one of plural product-digit output lines corresponding in decimal value to one product digit of the multiplied decimal value of said each input line, and partial-product control relay means responsive to the magnitude of a multiplicand digit of order next adjacent to that of said each selected multiplicand digit for modifying the input-output line interconnections effected by said multiplier relay control means to reflect in said interconnections the addition to said one output product digit of any partial-product contributed by said adjacent-order digit.

11. A numeric multiplier system comprising means for selecting multiplicand digits successively from highest to lowest orders and for energizing an individual one of plural decimal-valued input circuits in accordance with the decimal value of each said selected digit, multiplier control relay means actuated in response to the magnitude of a multiplier digit for connecting each of said input lines to an individual one of plural product-digit output lines corresponding in decimal value to one product digit of the multiplied decimal value of said each input line, and partial-product control relay means responsive to the magnitude of a multiplicand digit of order next adjacent to that of said each selected multiplicand digit for modifying the input-output line interconnections effected by said multiplier relay control means to reflect in said interconnections the addition to said one output product digit of any partial-product contributed by said adjacent-order digit.

12. A numeric multiplier system comprising means for selecting multiplicand digits successively from highest to lowest orders and for energizing an individual one of plural decimal-valued input circuits in accordance with the decimal value of each said selected digit, multiplier control relay means actuated selectively by the two and five digit values of a multiplier digit for connecting said input lines in pairs to an individual one of plural product-digit output lines corresponding in decimal value to one product digit of the multiplied digit value of said each input line, and partial-product control relay means responsive to said two and five digit values of said multiplier digit and to the magnitude of a multiplicand digit of respectively next-lower and next-higher order than that of said each selected multiplicand digit for modifying the input-output line interconnections effected by said multiplier relay control means to reflect in said interconnections the addition to said one output product digit of any partial-product contributed by said adjacent-order digit.

13. A numeric multiplier system comprising means for selecting multiplicand digits successively from highest to lowest orders and for energizing an individual one of plural decimal-valued input circuits in accordance with the decimal value of each said selected digit, multiplier control relay means actuated in response to a multiplier digit of value two for connecting said input lines in pairs to an individual one of plural product-digit output lines corresponding in decimal value to twice the digit value of said each input line, and partial-product control relay means responsive to said multiplier digit and to the magnitude of a multiplicand digit of next-lower order than that of said each selected multiplicand digit for modifying the input-output line interconnections effected by said multiplier relay control means to reflect in said interconnections the addition to said one output product digit of any partial-product contributed by said adjacent-order digit.

14. A numeric multiplier system comprising means for selecting multiplicand digits successively from highest to lowest orders and for energizing an individual one of plural decimal-valued input circuits in accordance with the decimal value of each said selected digit, multiplier control relay means actuated in response to a multiplier digit of value five for connecting said input lines in pairs to an individual one of plural product-digit output lines corresponding in decimal value to five times the digit value of said each input line, and partial-product control relay means responsive to said multiplier digit and to the magnitude of a multiplicand digit of next-higher order than that of said each selected multiplicand digit for modifying the input-output line interconnections effected by said multiplier relay control means to reflect in said interconnections the addition to said one output product digit of any partial-product contributed by said adjacent-order digit.

15. A numeric multiplier system comprising a plurality of input circuits each representing an individual different possible decimal value of a numeric multiplicand digit, means for selecting during each of successive time intervals an individual one of said input circuits corresponding to the decimal value of individual ones of successive multiplicand digits selected during said successive intervals from highest to lowest orders, a plurality of output circuits each representing an individual different possible value of a numeric product digit, multiplying means controlled by the magnitude of a multiplier digit and responsive during each said interval to the selected one of said input circuits for selecting one of said output circuits corresponding to the product value of the selected input circuit, partial-product means for initially controlling said selection means during each said interval to effect selection thereby of an input circuit corresponding to the decimal value of a next-adjacent-order multiplicand digit and for establishing the value of any partial-product contributed by said adjacent-order digit to modify in accordance therewith the selection by said multiplying means of said output circuit, and means for alternating the operations of said multiplying and control means in effecting each successive selection of said output circuits by said multiplying means.

References Cited in the file of this patent

UNITED STATES PATENTS 2,521,418 Sens-Olive -------------- Sept. 5, 1950

OTHER REFERENCES

"Synthesis of Electronic Computing and Control Circuits," by the Staff of the Computation Laboratory, Harvard University Press, May 17, 1951, pages 202, 203, 216, 217, 218, 219, 220.

UNITED STATES PATENT OFFICE
CERTIFICATE OF CORRECTION

Patent No. 3,028,087 April 3, 1962

Charles A. Walton

It is hereby certified that error appears in the above numbered patent requiring correction and that the said Letters Patent should read as corrected below.

Column 2, line 50, after "plug" insert -- hub --; column 5, line 68, for "holding" read -- hold --; column 8, line 61, after "adjacent-order" insert -- digit --; column 9, line 47, before "digits" insert -- product --.

Signed and sealed this 11th day of September 1962.

(SEAL)
Attest:

ERNEST W. SWIDER
Attesting Officer

DAVID L. LADD
Commissioner of Patents